US011754773B2

United States Patent
Li et al.

(10) Patent No.: US 11,754,773 B2
(45) Date of Patent: *Sep. 12, 2023

(54) CURVED EDGE-LIT LIGHT GUIDE

(71) Applicant: HLI SOLUTIONS, INC., Greenville, SC (US)

(72) Inventors: Qianshan Li, Glendora, CA (US); Michael Neuer, Covina, CA (US); Tomi Lin, Irvine, CA (US); Syed Raza, Rancho Palos Verdes, CA (US); Dean Dal Ponte, Glendale, CA (US); Prathika Appaiah, Pasadena, CA (US); Paul Lewis, Greenville, SC (US); Kevin Lu, Fountain Valley, CA (US)

(73) Assignee: HLI SOLUTIONS, INC., Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/519,115

(22) Filed: Nov. 4, 2021

(65) Prior Publication Data

US 2022/0057568 A1 Feb. 24, 2022

Related U.S. Application Data

(63) Continuation of application No. 16/875,400, filed on May 15, 2020, now Pat. No. 11,169,319.

(60) Provisional application No. 62/848,258, filed on May 15, 2019.

(51) Int. Cl.
*G02B 6/00* (2006.01)
*F21V 8/00* (2006.01)
*F21V 5/04* (2006.01)
*F21Y 115/10* (2016.01)

(52) U.S. Cl.
CPC ............ *G02B 6/0073* (2013.01); *F21V 5/048* (2013.01); *G02B 6/003* (2013.01); *G02B 6/0085* (2013.01); *F21Y 2115/10* (2016.08)

(58) Field of Classification Search
CPC .... G02B 6/0011; G02B 6/003; G02B 6/0085; G02B 6/0073; F21V 5/048; F21Y 2115/10
See application file for complete search history.

(56) References Cited

U.S. PATENT DOCUMENTS

| 6,443,582 B1* | 9/2002 | Tarne ..................... G02B 6/003 362/628 |
| 6,824,284 B2* | 11/2004 | Chinniah .............. F21S 43/245 362/330 |
| 9,169,983 B2* | 10/2015 | Miletich ................. F21S 8/026 |
| 9,835,300 B2* | 12/2017 | Feit ..................... F21V 19/0045 |
| 10,253,948 B1 | 4/2019 | Pickard |

(Continued)

OTHER PUBLICATIONS

International Search Report and Written Opinion for Related Application No. PCT/US2020/033155 dated Aug. 17, 2020 (13 pages).

*Primary Examiner* — Y M. Quach Lee
(74) *Attorney, Agent, or Firm* — Buckley, Maschoff & Talwalkar LLC (57) ABSTRACT

A luminaire includes a housing with a cavity, a non-planar lens, and a light emitter. The non-planar lens is coupled to the housing. The lens defines a generally circular footprint and a concavo-convex shape. The light emitter is positioned proximate an edge of the cavity and is configured to emit light into an edge of the lens and toward a center of the cavity.

20 Claims, 6 Drawing Sheets

(56) References Cited

U.S. PATENT DOCUMENTS

| | | |
|---|---|---|
| 2010/0027256 A1 | 2/2010 | Kinoshita |
| 2011/0110081 A1 | 5/2011 | Belknap et al. |
| 2014/0091697 A1 | 4/2014 | Shum |
| 2016/0018093 A1* | 1/2016 | Van Winkle ............ F21K 9/238 |
| | | 362/311.02 |
| 2017/0031080 A1* | 2/2017 | Speer ................... G02B 6/0055 |
| 2018/0045878 A1* | 2/2018 | Murata ................ G02B 6/0073 |
| 2018/0073688 A1* | 3/2018 | Xu ........................... F21K 9/68 |
| 2018/0113244 A1 | 4/2018 | Vasylev |
| 2018/0195705 A1 | 7/2018 | Wright et al. |
| 2019/0178453 A1 | 6/2019 | Zeng et al. |
| 2020/0073046 A1* | 3/2020 | Kim .................... G02B 6/0063 |

\* cited by examiner

CURVED EDGE-LIT LIGHT GUIDE

RELATED APPLICATION(S)

This application is a continuation of U.S. Ser. No. 16/875,400, filed May 15, 2020, which is based on U.S. Provisional Application 62/848,258, filed May 15, 2019, the disclosures of which are incorporated herein by reference in their entirety and to which priority is claimed.

BACKGROUND

The present disclosure relates to a light guide and more specifically, to a curved light guide for use with an edge-lit light.

SUMMARY

In some aspects, an edge-lit luminaire includes a housing with a cavity, a non-planar lens, and a light emitter. The non-planar lens is coupled to the housing. The lens defines a generally circular footprint and a concavo-convex shape. The light emitter is positioned proximate an edge of the cavity and is configured to emit light into an edge of the lens and toward a center of the cavity.

In some aspects, an edge-lit luminaire includes a housing having a top and a bottom opening at least partially defining a cavity. A non-planar lens is coupled to the housing that defines a generally circular footprint and a concavo-convex shape. A light emitter is positioned proximate an edge of the cavity. The light emitter oriented substantially parallel to the bottom opening and configured to emit light into an edge of the lens and toward a center of the cavity. At least a portion of the light emitted into the edge of the lens is redirected inside of the lens and emitted in a direction non-parallel to the bottom opening.

In some aspects, an edge-lit luminaire includes a circular housing including a cavity and a bottom opening. A non-planar lens is coupled to the housing. The lens includes edges to generally define a circular outer edge and a curved body extending between the edges. A light emitter is positioned proximate to one of the edges of the lens. The light emitter is configured to emit light through the edge and toward a center of the lens. At least a portion of the light emitted into the edge of the lens is redirected inside of the lens and emitted in a direction non-parallel to the bottom opening.

In some aspects, an edge-lit luminaire includes a housing including a cavity and a bottom opening. A driver housing is positioned in the cavity. The driver housing has a base and a cover. A driver is positioned in the driver housing. A reflector is coupled to the housing and positioned within the cavity. A lens is coupled to the housing. The lens includes flat edges to generally define a circular outer edge. The lens extending between a first plane and as second plane parallel to the first plane. An LED positioned proximate to one of the flat edges of the lens, the light emitter configured to emit light through the edge and toward a center of the lens.

Other aspects of the disclosure will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
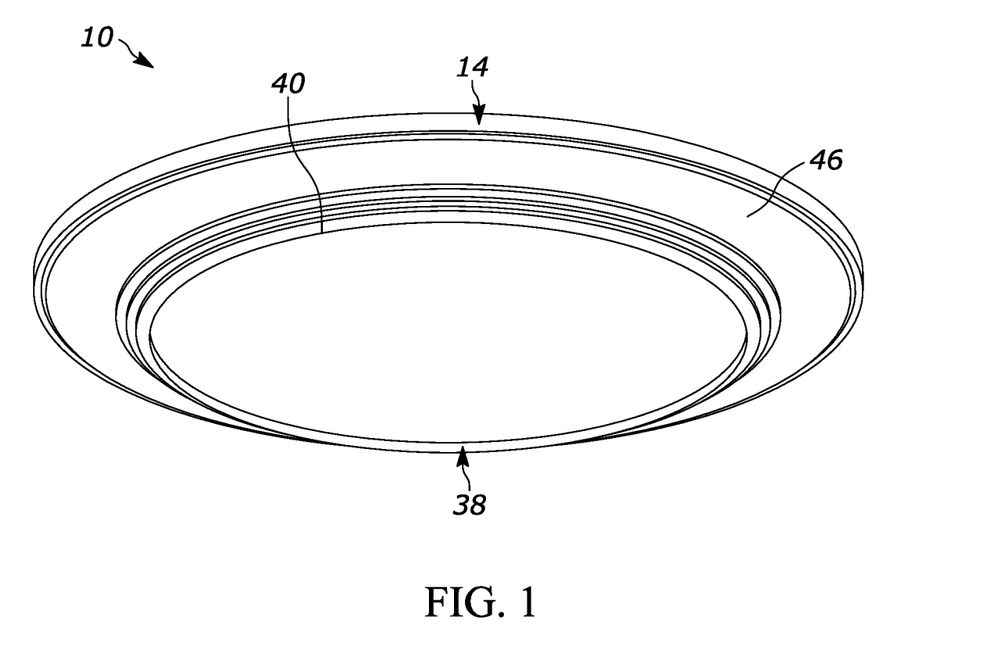
FIG. 1 is a perspective view of a luminaire.
Figure 2:
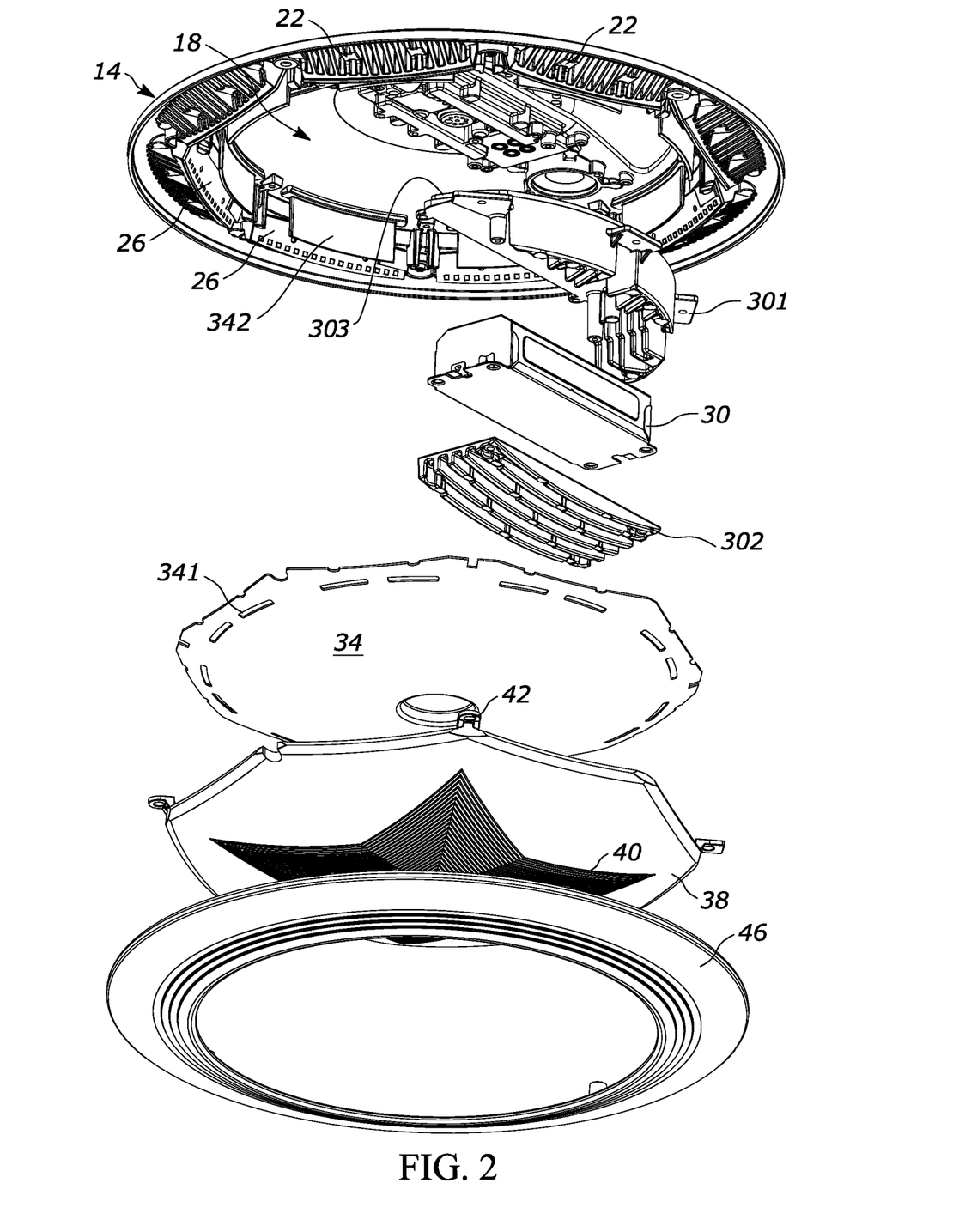
FIG. 2 is an exploded view of the luminaire of FIG. 1.
Figure 3:
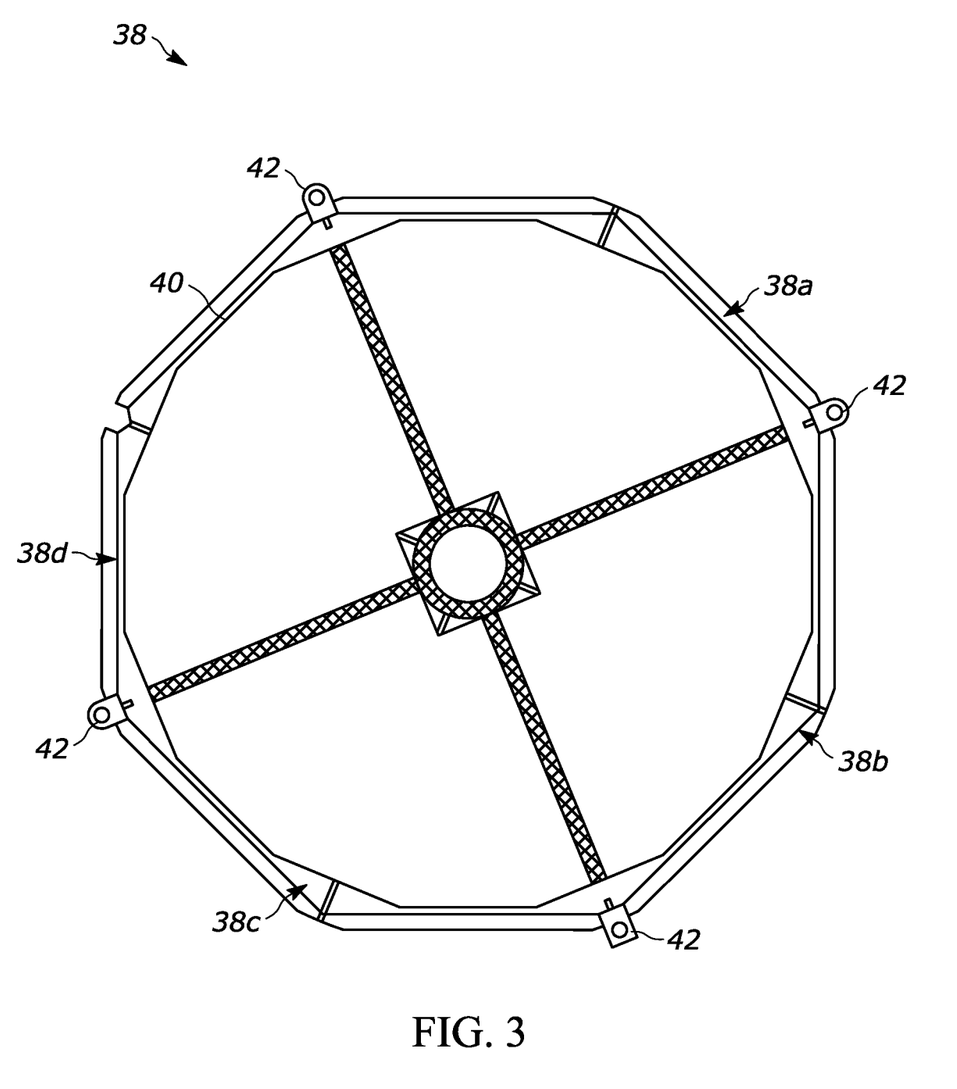
FIG. 3 is a perspective view of a lens used with the luminaire of FIG. 1.

FIGS. 1-3 illustrate a luminaire, generally designated 10. As shown in the illustrated embodiment, the luminaire 10 may be a canopy luminaire. Light emitted from the luminaire 10 may be directed generally downwardly, e.g., from a ceiling toward a floor.

As shown in FIGS. 1 and 2, the luminaire 10 includes a housing 14 that may be coupled to a ceiling or other horizontal support (not shown). The housing 14 includes a top and a bottom opening that at least partially defines an internal cavity 18 that faces toward the floor when the housing 14 is coupled to the ceiling. In the illustrated embodiment, housing 14 has a generally curvilinear configuration (e.g., cylindrical, spherical, conical, elliptical, etc). Heat sinks 22 can be disposed on the housing 14 and positioned between an outer edge of the housing 14 and the cavity 18. The cavity 18 includes a majority of a total volume of the housing 14, and extends up to the heat sinks 22. The heat sinks 22 define edges, so the cavity 18 is not circular (e.g., the cavity 18 has an octagonal configuration). Each of the heat sinks 22 can include a base and a plurality of fins that extend from the base toward the outer edge of the housing. The heat fins can taper from the base to the outer edge to provide a lower profile of the heat sink at the outer edge than the base.

As shown in FIG. 2, light emitters 26 are disposed around the periphery of the cavity 18. Each light emitter 26 is also connected to one of the heat sinks 22, for example to the base of the heat sink 22. The light emitters 26 can be in direct contact with a respective heat sink 22 or be spaced by a thermal interface (e.g., pad, adhesive, etc). The light emitters 26 can also be placed adjacent to but in close thermal communication with the heat sinks 22.

The light emitters 26 are positioned in order to direct light toward a center of the housing 14 (e.g., orthogonal to the direction of the floor). In the illustrated embodiment, each light emitter 26 includes a board (e.g., a printed circuit board) and one or more light emitting diodes (LED) extending from the board toward the center of the housing. One LED board can be connected to each heat sink 22. In other embodiments, there may be a different number of heat sinks 22 and LED boards 26 as required for a resultant light output.

As best shown in FIG. 2, a driver 30 can be connected to the housing 14 and positioned in the cavity 18. The driver can be positioned in a driver housing having a base 301 and a cover 302 that is releasably connected to the base 301. The base 301 and the cover 302 combine to substantially cover the driver 30 inside of the housing 14. The driver housing can act as a heat sink to dissipate heat generated by the driver 30. The base 301 and cover 302 can each include one or more heat dissipating fins. For example, the base 301 can include a plurality of internal heat fins and the cover 302 can include a plurality of external fins. Ion certain embodiments, the base 301 can include an upper flange 303. This flange 303 can mate with an opening in the housing 14 so that the driver housing is in direct communication with an exterior environment. This can help dissipate heat outside of the housing 14. A gasket can be positioned around the flange 303 to help prevent ingress of fluid, dirt, or other debris.

The driver 30 is electrically connected to the light emitters 26 and controls an output of the LEDs. For example, the driver 30 can control when the LEDs are On/Off, as well as a brightness and intensity of the LEDs. The driver 30 may control each light emitter 26 separately or can control all of the light emitters 26 together. In some embodiments, a user may communicate with the driver 30 using a controller (e.g., a computer, cellphone, tablet, etc) via a wireless network (e.g., WiFi, Bluetooth, radio, etc.).

A reflector 34 is coupled to the housing 14 and is positioned within the cavity 18. The reflector 34 includes edges that substantially correspond to the edges of the cavity 18. A diameter of the reflector 34 is less than a diameter of the cavity 18, which allows the reflector 34 to be positioned within the cavity 18. In the illustrated embodiment, the reflector 34 also extends substantially to an edge of each light emitter 26.

A light guide or lens 38 is coupled to the housing 14 and is positioned to cover and enclose the cavity 18. The lens 38 is shaped substantially similarly to the reflector 34, and defines a generally circular perimeter. The lens 38 includes angled sides in order to approximate a circular shape. The reflector 34 is positioned between the top of the housing 14 and the lens 38. In the illustrated embodiment, the lens 38 has an octagonal configuration, and includes the same number of sides as the cavity 18 (e.g., one side for each heat sink 22). The lens 38 has a maximum diameter of 13 inches. In other embodiments, the maximum diameter of the lens 38 may be more or less than 18 inches.

The lens 38 can include flat sides or edges with a major surface that curves from the sides towards a center. Patterns or microstructures 40 are included on the surface of the lens 38. In the illustrated embodiment, the curvature is substantially smooth, and defines a dome shape (e.g., a concavo-convex shape). In some embodiments, the curve has a maximum height of 1.5 inches as defined by a plane extending parallel to the outer edge of the lens 38. In other embodiments, the curve may have a maximum height that is less than or greater than five inches. The microstructure 40 may cover any portion of the lens 38, and may be symmetrical about a center of the lens 38.

Mounting features 42 are disposed around the circumference of the lens 38. In the illustrated embodiment, the mounting features 42 are apertures that receive fastening members (e.g., threaded screws—not shown). The fastening members coupled the lens 38 to the housing 14. In other embodiments, fastening members may be formed with the lens 38 in order to directly couple the lens 38 to the housing 14 (e.g., snap-fit connectors). When the lens 38 is coupled to the housing 14, the lens 38 is positioned in a convex orientation. In other embodiments, the lens 38 may be in a concave orientation.

Sides of the lens 38 are also aligned with the light emitters 26 when the lens 38 is coupled to the housing 14. The sides of the lens 38 can extend substantially orthogonal to the bottom opening of the housing 14 or have a slight angle thereto (e.g., less than 45 degrees) and include a thickness greater than a height of the LEDs on the light emitters 26. The sides of the lens 38 are positioned adjacent to the light emitters 26 when the lens 38 is coupled to the housing 14. This allows the light emitted from the LEDs to be directed substantially into the sides of the lens 38. The configuration of the lens 38 and the light emitters 26 therefore defines an edge-lit configuration, where the light emitted from the LEDs is initially directed orthogonal to the illuminated area and redirected by the lens 38. The lens 38 includes internal structure that directs the light from the sides through the lens 38 and out of the lens 38 orthogonal to the LEDs.

A cover 46 can be coupled to the housing 14 after the lens 38 has been coupled to the housing 14 in order to further secure and protect the lens 38. The cover 46 is open at the center, and does not cover the microstructure 40. The cover 46 may also provide an aesthetic appearance to the luminaire 10 by covering the mounting features 42.

In use, the driver 30 powers the light emitter 26, causing them to emit light. The light travels into the lens 38 and towards the center, since the lens 38 is adjacent to the LEDs. The reflector 34 is positioned adjacent to a rear surface of the lens 38 (i.e., the surface of the lens 38 facing the cavity 18). The reflector 34 substantially blocks light from being emitted toward the cavity 18 and directs any light attempting to leave the lens 38 in that direction back into the lens 38.

Figure 4:
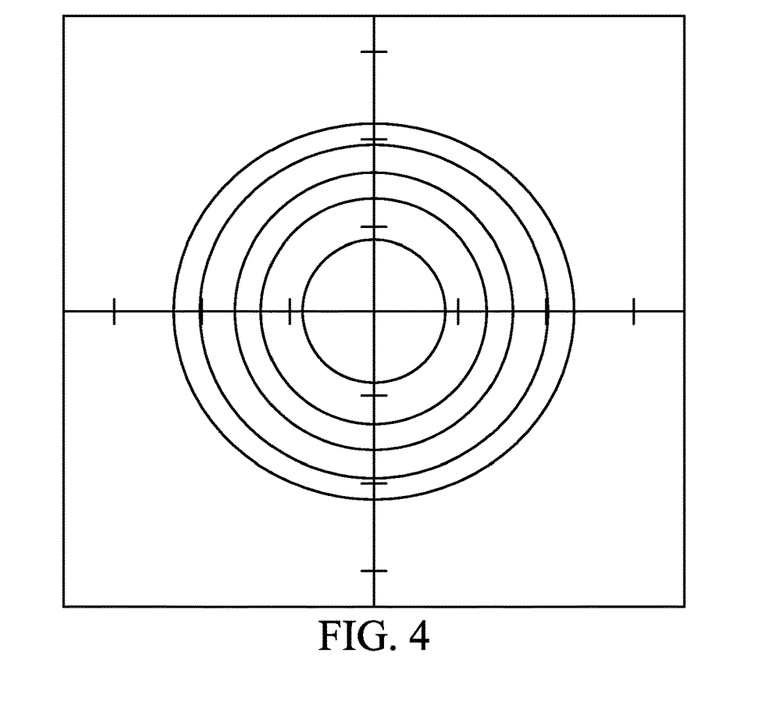
FIG. 4 is a first light distribution output by the luminaire of FIG. 1.
Figure 5:
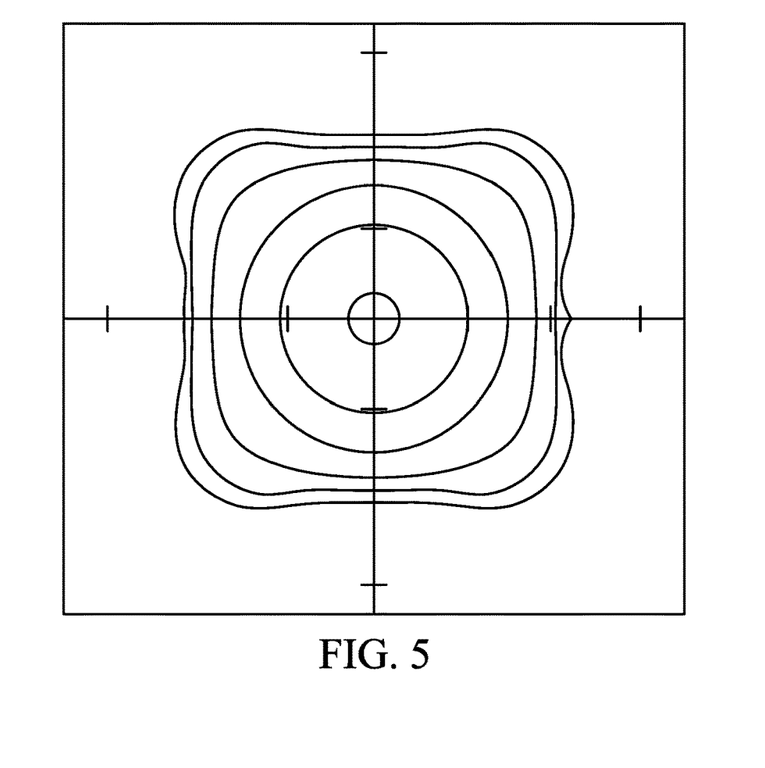
FIG. 5 is a second light distribution output by the luminaire of FIG. 1.
Figure 6:
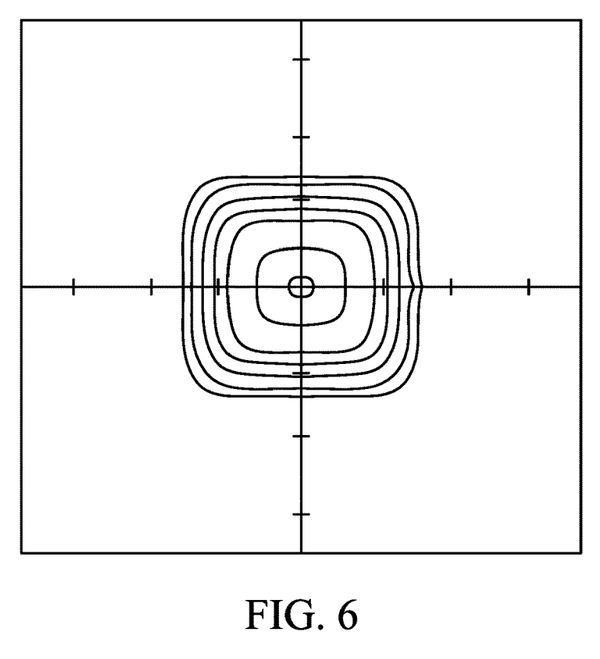
FIG. 6 is a third light distribution output by the luminaire of FIG. 1.
Figure 7:
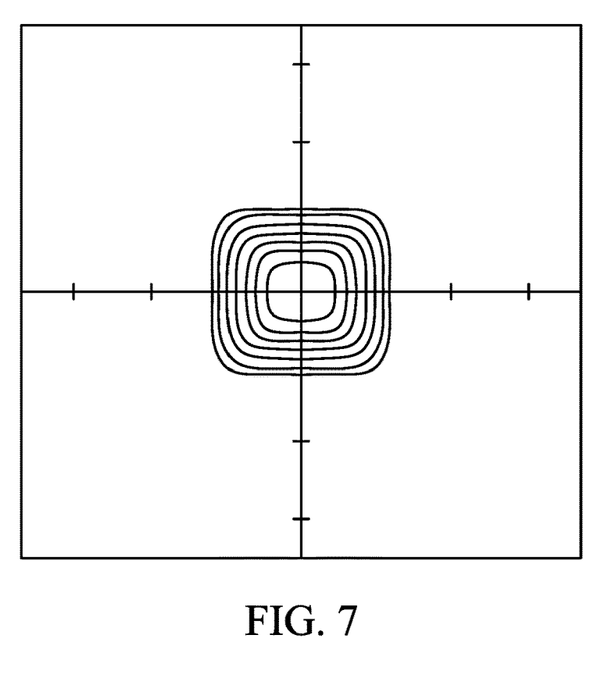
FIG. 7 is a fourth light distribution output by the luminaire of FIG. 1.
Figure 8:
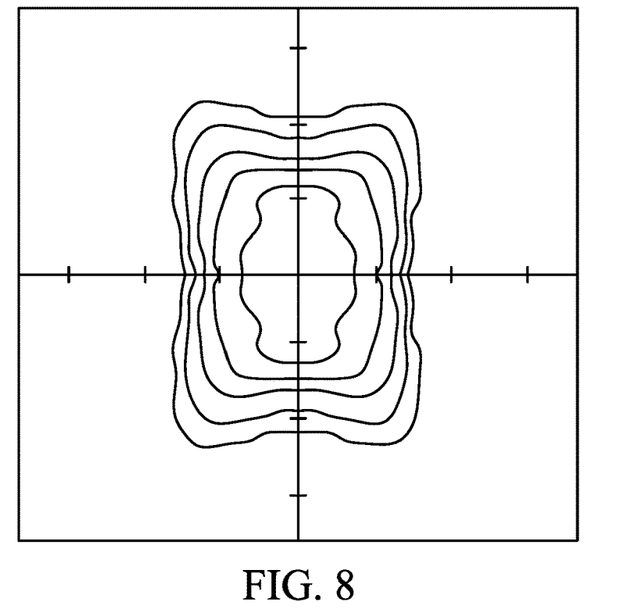
FIG. 8 is a fifth light distribution output by the luminaire of FIG. 1.
Figure 9:
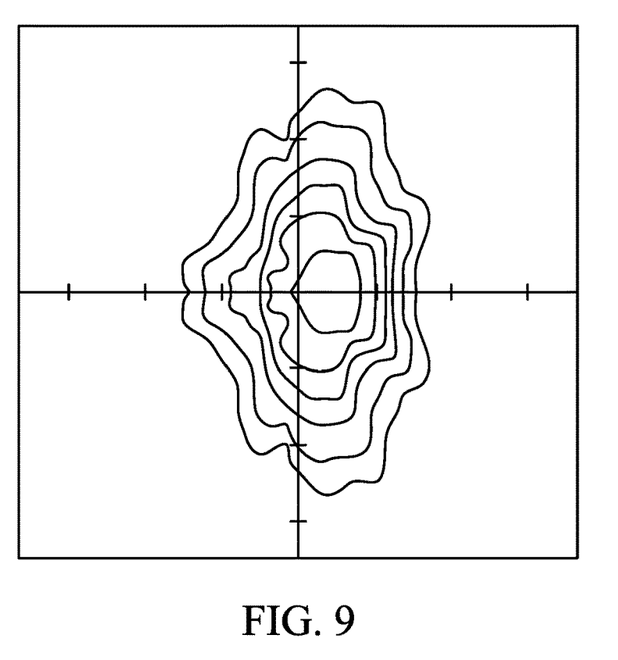
FIG. 9 is a sixth light distribution output by the luminaire of FIG. 1.

Since light is blocked by the reflector 34 from being emitted into the cavity 18, light can only escape the lens 38 through the emission direction of the luminaire 10. The microstructure 40 on the surface of the lens 38 assists in directing the light out of the lens 38. For example, light is able to more easily exit the lens 38 through the microstructure 40 than through areas of the lens 38 that lack the microstructure 40. The light emitted by the lens 38 through the microstructure 40 creates a distribution in the emission direction of the luminaire 10 (see e.g., FIGS. 4-9). For example, a first distribution is generally circular (see e.g., FIG. 4), and is defined by concentric circles of different light intensity (e.g., a type 5 wide distribution). The second, third, fourth, and fifth distributions are generally rectangular (see e.g., FIGS. 5-8). These distributions are generally symmetric about two orthogonal axes. The second distribution (e.g., a type 5 wide square distribution), the third distribution (e.g., a type 5 medium square or round distribution), and the fourth distribution (e.g., a type 5 narrow square or round distribution) are defined by concentric circles and squares. The squares have rounded corners. In the second distribution, the outermost square includes concave sides. The fifth distribution (see e.g., FIG. 8) includes generally rounded rectangular shapes, which include concave sides (e.g., a type 5 rectangular distribution). The sixth distribution (e.g., FIG. 9) is asymmetric about one of the two axes (e.g., a type ¾ asymmetric distribution), although it can also be asymmetric about both axes.

In some embodiments, the lens 38 may be made of multiple sections (e.g., four sections 38a-38d). Each section 38a-38d includes a portion of the total microstructure 40. During manufacturing, different sections 38a-38d may be coupled (e.g., fused) together in order to form a lens 38. This allows users to customize the specific distribution pattern of the finished lens 38. In other embodiments, the sections 38a-38d may be removably coupled together.

In some embodiments, the lens 38 may include an uplight or an uplight feature. The uplight feature may be positioned proximate an edge of the lens 38, and outside of the microstructure 40. The uplight feature can also be provided by light transmission sections on the reflector 34, so that light is able to exit the reflector 34, and not be reflected back into the lens 38. For example, the reflector 34 can include one or more slots 341 (as shown in FIG. 2) positioned proximate an outer edge. The slots 341 allow light to pass through the reflector 34. In some embodiments, lenses or other transparent or translucent elements can be connected to or formed as part of the reflector 34 to allow light transmission. Upper lenses 342 can be positioned in the housing 14, for example extending between the reflector 34 and a top of the housing 14. The upper lenses 342 can transfer the light from the slots 341 to the top of the fixture to create an uplight effect. The uplight directs light in a direction generally opposite the direction the light exits through the microstructure 40 (e.g., toward a ceiling instead of toward a floor). For example, light can pass through the slots in the reflector to be emitted toward the cavity 14 and/or the outside of the housing 14. The light emitted by the uplight may at least partially illuminate the support surface (e.g., the ceiling). The luminaire 10 may also include lens (not shown) on each LED board 26 to further guide toward the support surface. Together, these uplights may reduce or eliminate a cave effect caused by the luminaire 10.

In some embodiments, the luminaire 10 may include sensor(s) (not shown). The sensor(s) may be an occupancy sensor, a profile dimming sensor, or any other type of sensor. The sensor may be used to control the light output from the luminaire 10.

Although aspects have been described in detail with reference to certain preferred embodiments, variations and modifications exist within the scope of one or more independent aspects as described.

What is claimed is:

1. An edge-lit luminaire comprising:
a housing having a top and a bottom opening at least partially defining a cavity;
a non-planar lens coupled to the housing that defines a generally circular footprint and a concavo-convex shape, the lens being formed from multiple discrete sections;
a light emitter positioned proximate an edge of the cavity, the light emitter oriented substantially parallel to the bottom opening and configured to emit light into an edge of the lens and toward a center of the cavity; and
a reflector coupled to the housing between the top of the housing and the lens, the reflector configured to direct light emitted toward the cavity back into the lens,
wherein at least a portion of the light emitted into the edge of the lens is redirected inside of the lens and emitted in a direction non-parallel to the bottom opening.

2. The edge-lit luminaire of claim 1, wherein the lens includes a microstructure capable of producing a predetermined distribution of light.

3. The edge-lit luminaire of claim 1, further comprising a heat sink disposed on an outer edge of the cavity, the light emitter coupled to the heat sink.

4. The edge-lit luminaire of claim 1, further comprising a driver positioned in the housing and retained in a driver housing.

5. The luminaire of claim 4, wherein the driver housing includes a base, and wherein a portion of the base extends through an opening in the top of the housing to provide direct communication with an environment external to the housing.

6. The luminaire of claim 1, wherein the lens sections are fused together.

7. An edge-lit luminaire comprising:
a circular housing including a cavity and a bottom opening;
a non-planar lens coupled to the housing, the lens including edges to generally define a circular outer edge and a curved body extending between the edges, the lens being formed from multiple discrete sections;
a light emitter positioned proximate to one of the edges of the lens, the light emitter configured to emit light through the edge and toward a center of the lens,
wherein at least a portion of the light emitted into the edge of the lens is redirected inside of the lens and emitted in a direction non-parallel to the bottom opening, and
wherein a reflector coupled to the housing and includes at least one uplight feature configured to allow light emitted toward the cavity to exit the reflector and illuminate a support surface.

8. The edge-lit luminaire of claim 7, wherein the lens sections are releasably connected together.

9. The edge-lit luminaire of claim 7, further comprising the reflector coupled to the housing between a surface of the cavity and the lens, the reflector configured to direct light emitted toward the cavity back into the lens.

10. The edge-lit luminaire of claim 9, wherein the uplight feature includes a light transmission feature allowing light to pass through the reflector toward the cavity.

11. The edge-lit luminaire of claim 7, wherein the lens includes eight edges that approximate a circular shape.

12. The edge-lit luminaire of claim 7, wherein the light emitter is a first light emitter, the luminaire further comprising a plurality of light emitters, each light emitter of the plurality of light emitters positioned proximate an edge of the lens and configured to emit light toward a center of the lens.

13. The edge-lit luminaire of claim 7, wherein the lens includes a microstructure capable of producing a predetermined distribution of light.

14. The edge-lit luminaire of claim 13, wherein the lens is formed from four quadrants, each quadrant including a portion of the microstructure.

15. The edge-lit luminaire of claim 7, wherein the lens curves between a first plane and a second plane parallel to the first plane, the second plane is spaced apart from the first plane by approximately five inches.

16. An edge-lit luminaire comprising:
a housing including a cavity and a bottom opening;
a driver housing positioned in the cavity, the driver housing having a base and a cover;
a driver positioned in the driver housing;
a reflector coupled to the housing and positioned within the cavity;

a lens coupled to the housing, the lens includes flat edges to generally define a circular outer edge, the lens extending between a first plane and as second plane parallel to the first plane, and the lens being formed from multiple discrete sections; and an LED positioned proximate to one of the flat edges of the lens, the light emitter configured to emit light through the edge and toward a center of the lens, wherein a reflector coupled to the housing and includes at least one uplight feature configured to allow light emitted toward the cavity to exit the reflector and illuminate a support surface.

17. The edge-lit luminaire of claim 16, wherein the lens includes eight edges that approximate a circular shape.

18. The edge-lit luminaire of claim 16, wherein the light emitter is a first light emitter, the luminaire further comprising a plurality of light emitters, each light emitter of the plurality of light emitters positioned proximate an edge of the lens and configured to emit light toward a center of the lens.

19. The edge-lit luminaire of claim 16, wherein the lens includes a microstructure capable of producing a predetermined distribution of light.

20. The edge-lit luminaire of claim 19, wherein the predetermined distribution of light has a generally rectangular shape with concentric circles, the rectangular shape having generally concave sides.

* * * * *